No. 658,741. Patented Sept. 25, 1900.
O. PARPART.
ELECTRIC WELDING MACHINE.
(Application filed Jan. 31, 1898.)
(No Model.) 5 Sheets—Sheet 1.
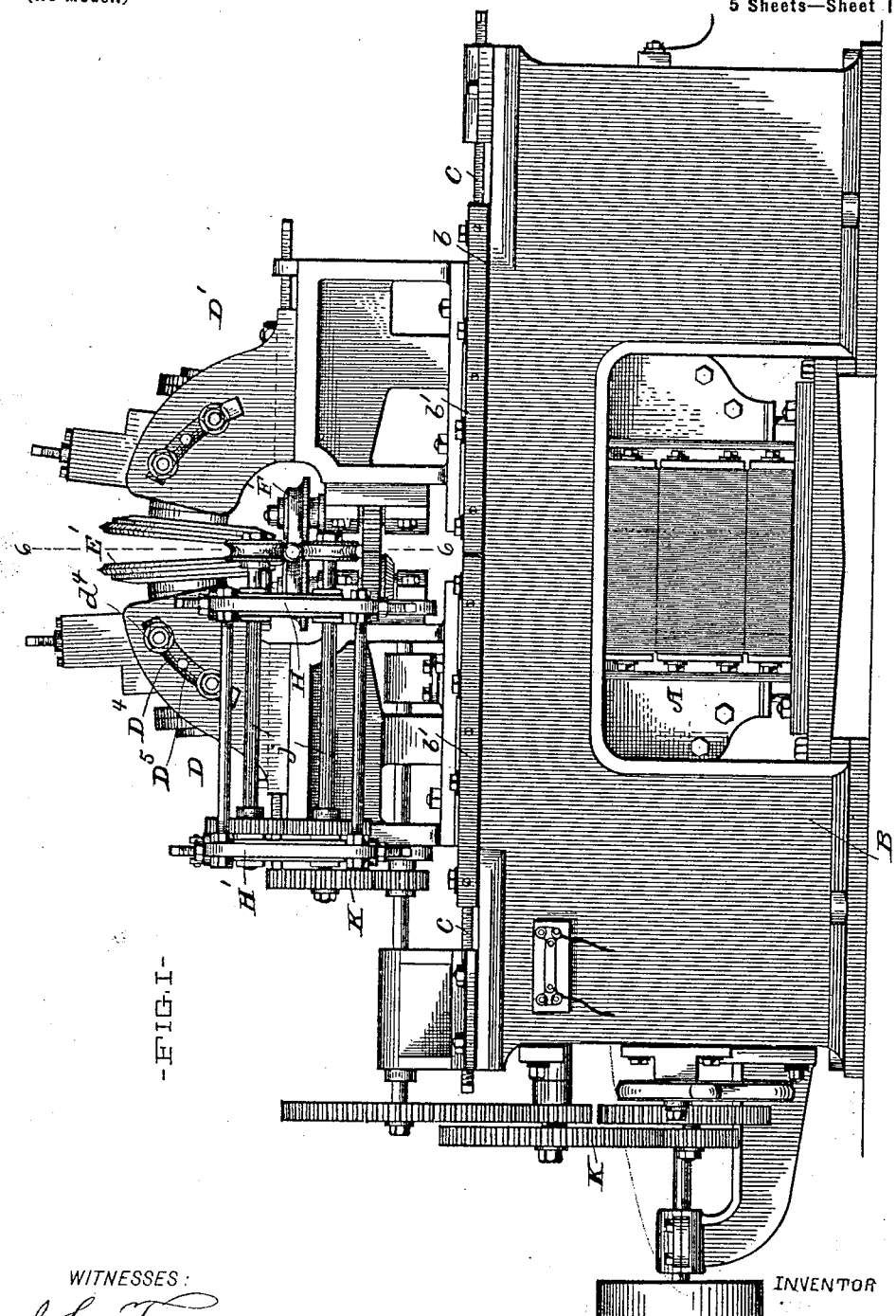
WITNESSES:
J.C. Turner
D.T. Davies
INVENTOR
BY Otto Parpart
Thos. A. Hall
ATTORNEY.

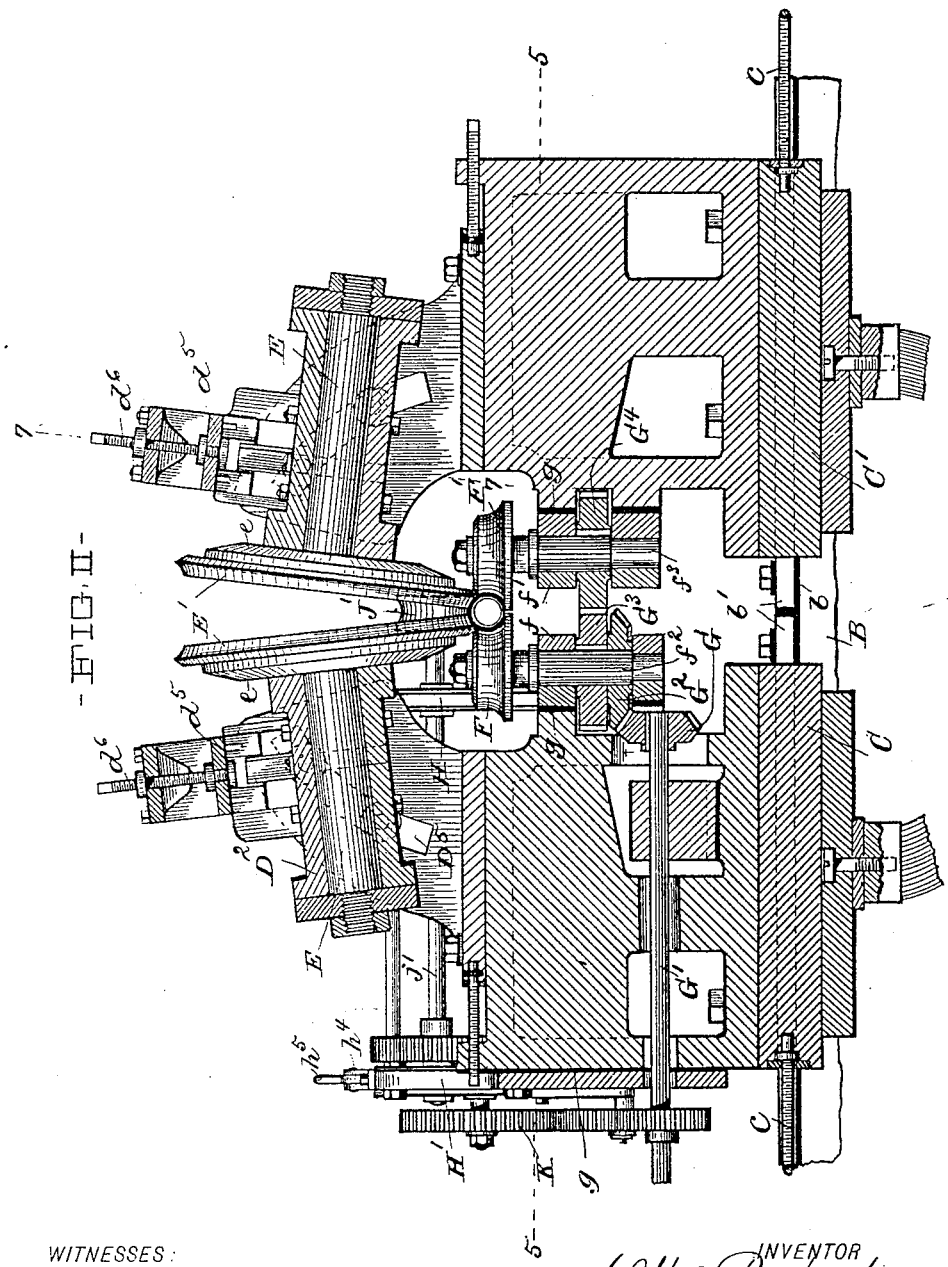

No. 658,741. Patented Sept. 25, 1900.
O. PARPART.
ELECTRIC WELDING MACHINE.
(Application filed Jan. 31, 1898.)
(No Model.) 5 Sheets—Sheet 3.
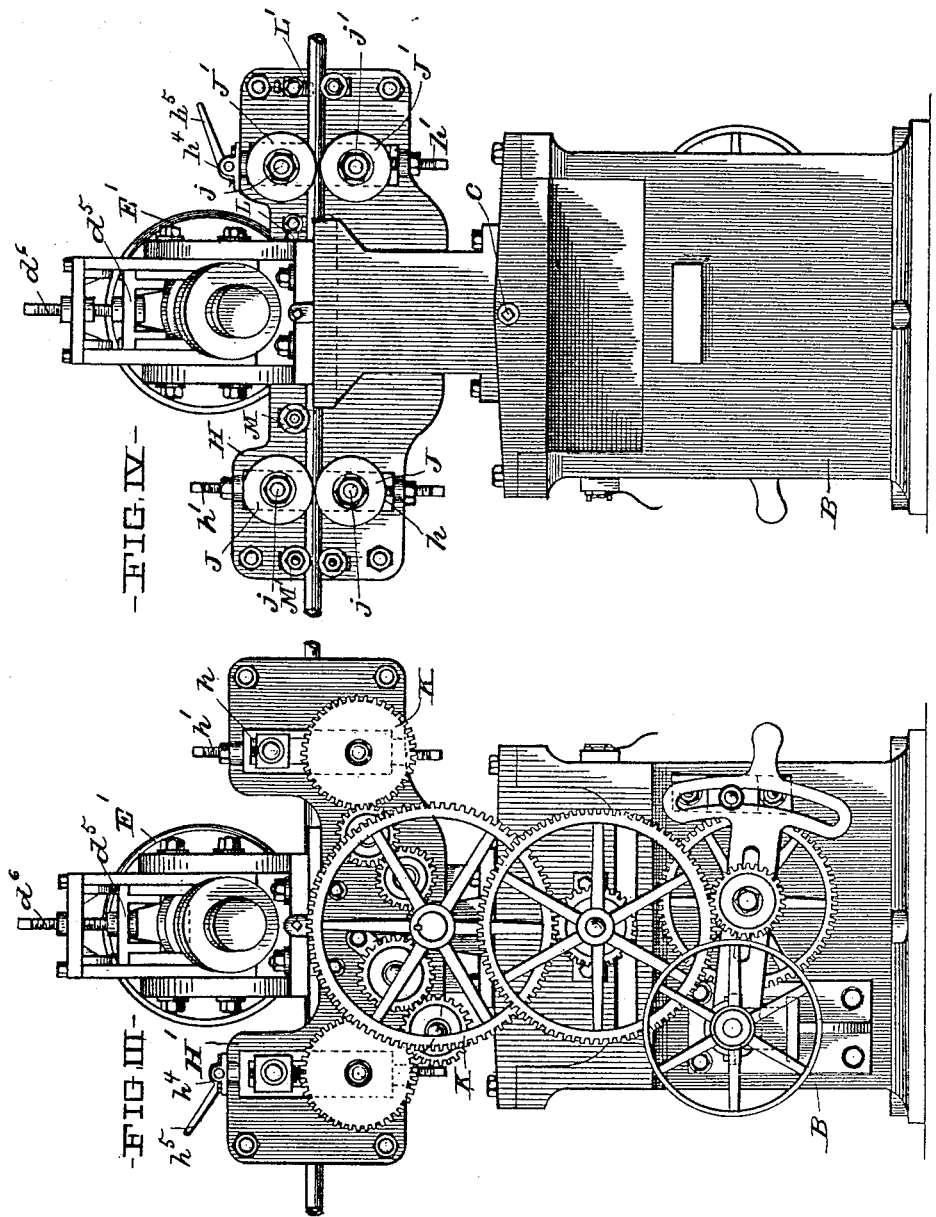
WITNESSES:
INVENTOR
Otto Parpart
BY
Thos B Hall
ATTORNEY.

No. 658,741. Patented Sept. 25, 1900.
O. PARPART.
ELECTRIC WELDING MACHINE.
(Application filed Jan. 31, 1898.)
(No Model.) 5 Sheets—Sheet 4.
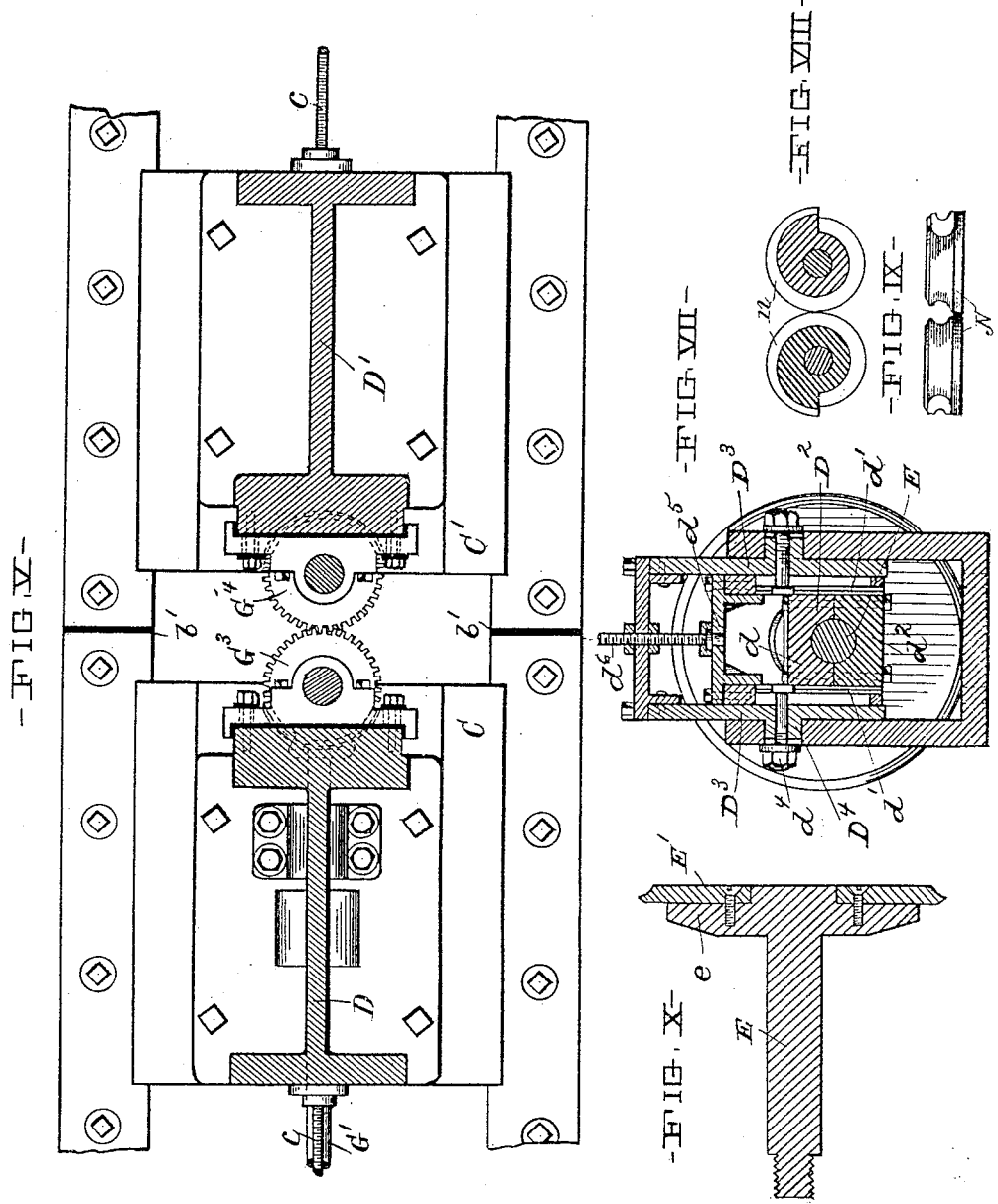

No. 658,741. Patented Sept. 25, 1900.
O. PARPART.
ELECTRIC WELDING MACHINE.
(Application filed Jan. 31, 1898.)
(No Model.) 5 Sheets—Sheet 5.
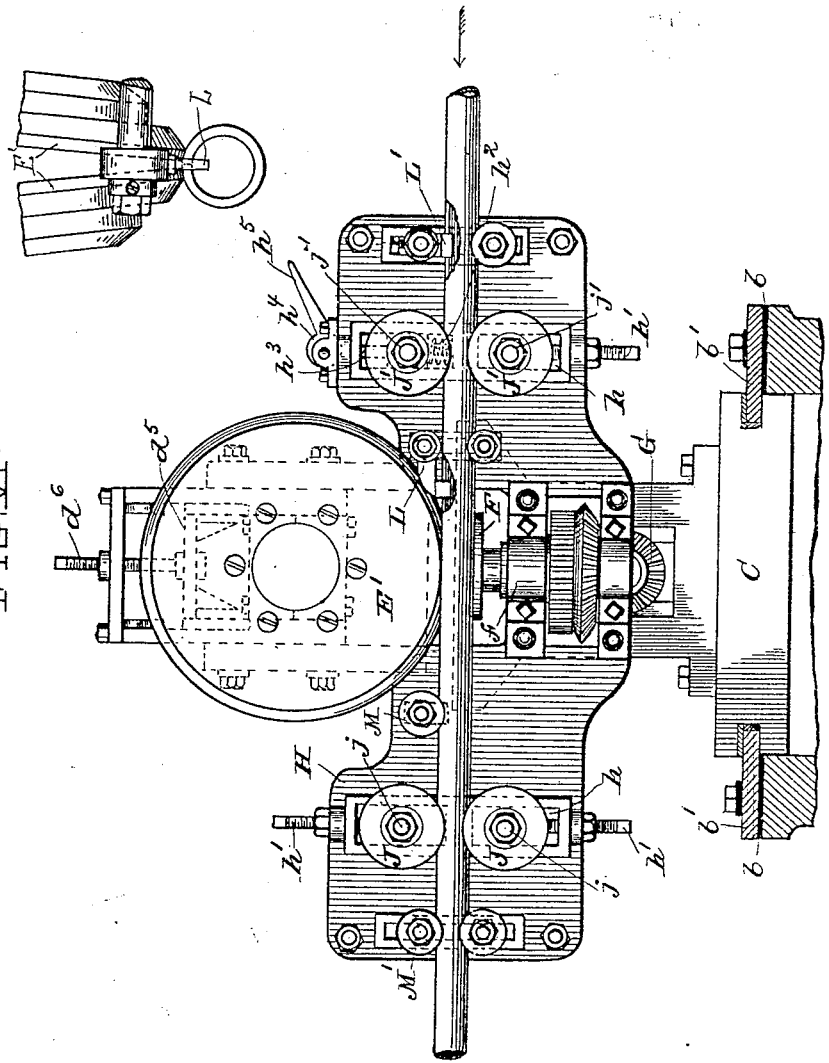
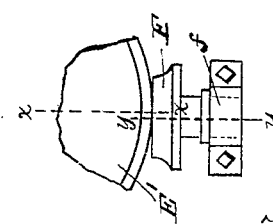
WITNESSES:
J. C. Turner
D. T. Davies
INVENTOR
Otto Parpart
BY
Thos. A. Hall
ATTORNEY.

UNITED STATES PATENT OFFICE.

OTTO PARPART, OF CLEVELAND, OHIO, ASSIGNOR, BY MESNE ASSIGNMENTS, TO THE STANDARD WELDING COMPANY, OF SAME PLACE.

ELECTRIC WELDING-MACHINE.

SPECIFICATION forming part of Letters Patent No. 658,741, dated September 25, 1900.

Application filed January 31, 1898. Serial No. 668,527. (No model.)

*To all whom it may concern:*

Be it known that I, OTTO PARPART, a citizen of the United States, and a resident of Cleveland, county of Cuyahoga, and State of Ohio, have invented a new and useful Improvement in Tube-Welding Machines, of which the following is a specification, the principle of the invention being herein explained and the best mode in which I have contemplated applying that principle, so as to distinguish it from other inventions.

The object of my invention is to provide a machine for electrically welding the butt-joints of tubes.

The nature of the invention consists of the means hereinafter described, and particularly pointed out in the claims.

The annexed drawings and the following description set forth in detail certain mechanism embodying the invention, such disclosed means constituting but one of various mechanical forms in which the principle of the invention may be used.

Figure I is an elevation of that end of the machine from which the welded tube is passed out, the final set of pressure-rollers being omitted in order to avoid confusion of members. Fig. II is a vertical cross-section of the machine, looking in the direction from which the tube comes in its passage, the joint-guide being omitted to prevent confusion of members. Fig. III is a left end elevation thereof. Fig. IV is a right end elevation thereof. Fig. V is a horizontal cross-section on line 5 5 of Fig. II. Fig. VI is an enlarged detail view of a central vertical section on line 6 6 of Fig. I, excepting certain members shown in elevation. Fig. VII is a detail section of one of the conducting-roll stands on line 7 7 of Fig. II. Figs. VIII and IX are respectively horizontal, sectional, and side elevation views of a pair of compression-rolls for taper-tube work. Fig. X is a longitudinal central sectional view of one of the conducting-rolls and its spindle. Fig. XI is a detail view of parts of one conducting-roll and compression-roll. Fig. XII is a detail vertical sectional view showing the position of the joint-guide relatively to the conducting-rolls.

An electric transformer A is inclosed and supported in a suitable bed-frame B, upon the upper face of which slide horizontally two platens C C', Fig. II. Each of such platens is connected with the transformer and is electrically insulated from the said bed-frame B by insulation-pieces $b$, Fig. VI, such insulation-pieces insulating the guide-plates $b'$, which support and guide said platens from the bed-frame. Screws $c$ serve to move said platens toward and from each other. Bolted, respectively, upon the platens C and C' are two stand-frames D and D', Figs. I and II. In each of said frames is supported a journal-box $D^2$, Fig. II, which journals a spindle E, carrying at its inner extremity a current-conducting roll E'. The cap $d$, Fig. VII, of said box fits between two lateral flanges $d'$, formed integral with the lower portion $d^2$ of the box. The said portion $d^2$ slides snugly between the lateral faces of a shoe $D^3$ and is formed with two lateral T-grooves, in which are adapted to slide the heads of bolts $d^4$, which extend through the shoe and project on the outside of the stand-frames. A yoke $d^5$ is bolted to the top of the shoe $D^3$ and has attached to it a screw $d^6$, by which it may be moved upwardly or downwardly. Two lateral segments $D^4$ are formed integral with the sides of the yoke and project into segmental slots $D^5$, Fig. II, formed in the frame. The centers of the segments respectively lie approximately in the axis of the tube which is being welded, whereby by shifting the position of the segments, and hence the spindles, the conducting-rolls may be adjusted to accommodate different sizes of tubes, all points in the said rolls moving on such adjustment in the arcs of circles whose centers are the axis of the tube. The bolts $d^4$ are provided with washers of larger diameter than the width of the slot, whereby the shoes may be firmly bolted in their required positions.

Each conducting-roll E' is formed of a disk of pure copper bolted upon a flange $e$, formed upon the end of spindle E, and has a concave working face which bears directly upon its appropriate side of the longitudinal joint. The two conducting-rolls having a clear space between each other are adapted to bear, respectively, upon the opposite edge portions of the butt-joint of the tube to be welded, while free from bearing upon such joint, each of such conducting-rolls having contact with only one of said two edge portions and the construction of the machine being such the electric current is transmitted across the joint by said edge portions when the tube is being welded. The vertical plane passing through the axes of the conducting-rolls is before the vertical plane passing through the axes of the compression-rolls F and F', such two planes being parallel with each other and at right angles to the line of the tube movement. Fig. XI is a detail view, on an enlarged scale, showing parts, respectively, of one conducting-roll and one compression-roll, the dotted line $x$ $x$ marking the axial plane of such conducting-roll and the dotted line $y$ $y$ marking the axial plane of the compression-roll. I prefer to have the axial plane of the conducting-rolls from one-eighth to one-quarter of an inch before the axial plane of the compression-rolls. While the axial plane of the conducting-rolls across the line of movement of the tube is slightly before the axial plane of the compression-rolls across such line, yet the two sets of rolls are relatively located, so that a plane right angular to said line of movement of the tube may pass through all four rolls.

In operative position the two conducting-rolls are in equal degree inclined to a plane determined by the longitudinal tube-joint and the axis of the tube. This inclined position of the current-conducting rolls results in a sufficient pressure on the tube to insure the perfect contact of the free edges of the joint that is to be welded without bending or indenting the tube at the points of contact—that is, such force which causes such free edges to approach each other is exerted in a direction as nearly tangential to the curve of the tubes, and hence as nearly parallel with the material at such points of contact as is practicable.

Respectively on the opposite faces of the stand-frames D and D' are bolted and electrically insulated from said frame by insulation-pieces $g$, Fig. II, two bearings $f$ and $f'$, such bearings journaling, respectively, spindles $f^2$ and $f^3$, which carry at their upper extremities the compression-rolls F and F'. Roll F is driven by a bevel-gear G, secured to driving-shaft G', and meshing with bevel-gear $G^2$, secured to spindle $f^2$, such spindle having secured to it spur $G^3$, which latter meshes with spur-gear $G^4$, secured to spindle $f^3$. Each of said compression-rolls is formed upon its periphery with a concave face adapted to receive and partially inclose a tube. These two compression-rolls F and F' may be of any suitable size to correspond with the different sizes of tubing to be welded, they being detachably connected with their respective spindles. These two compression-rolls, as well as the two conducting-rolls, operate to make a definite and material upset on each of the two meeting edge portions of the tube, the construction and adaptation of all parts being such as to insure such upsetting formation to a substantial degree.

Bolted upon the face of the stand-frame D is a frame H, Figs. I, III, IV, and VI, such frame being electrically insulated from said stand-frame by insulation-pieces $g$. On the opposite side of said stand-frame is bolted and electrically insulated a second frame H', Fig. II. The electric current in its passage between its opposite electric poles must pass entirely and exclusively by way of the two current-conducting rolls, the construction and insulation of all machine parts excluding other ways of passage.

The two frames H and H' form bearings for two sets of draft-roll spindles $j$ and $j'$, Fig. I, such spindles carrying on their inner extremities the two sets of draft-rolls J and J', Fig. VI, such draft-roll sets being respectively on each side in the line of the tube-movement of the compression-rolls F and F'. The said spindles are driven by a train of gears K, which drive the upper draft-rolls in one direction and the lower rolls in the opposite direction, said directions being such as to move the tube forward, such direction of movement being shown as from right to left in Fig. VI. The said draft-roll spindles are journaled in boxes which slide in slots $h$ and whose position, with the exception, as hereinafter shown, of the upper one of the pair of rolls J', is regulated and fixed by screws $h'$. Beneath the box forming the bearing for the spindle of the upper one of the pair of rolls J' is a helical spring $h^2$, such spring bearing against the lower face of said box and tending to push the latter up. Rod $h^3$, bearing against the upper face of said box, projects above the upper edge of the frame H, where it engages with a cam $h^4$, formed upon a lever $h^5$, journaled on the upper face of the frame. Thus the upper roll may be retracted and the two rolls be quickly stopped or started, as desired.

The distance between the two pairs of draft-rolls should be less than the length of the tube, so that during compression one or the other of the sets of draft-rolls engages the tube, insuring an unvarying draft upon the tube, as a result of which every point along the joint is subjected to the same amount of heat and pressure, thereby making a homogeneous weld throughout the length of such joint.

On opposite sides of the initial draft-rolls J' and in the line of the tube movement are respectively located, suitably secured to the stand H, two tube-joint guides L and L', Fig. VI. Guide L' directs the tube, with its joint, in proper position relatively to the draft-rolls J'. Guide L directs the tube, with its joint in proper position relatively to the conducting-rolls E'. Each of these two joint-guides is located in a plane passing centrally through the clear space between the two conducting-rolls and is adapted to fit between the two edges of the tube-joint. The correct position of the tube-joint relatively to the feed-rolls as the tube is introduced into the machine is thus effected and the correct position of the tube-joint relatively to the conducting-rolls as the tube is fed forward is also thus effected. Thereby each of the two conducting-rolls is caused to have contact with only its appropriate one of the two edge portions of the tube, and each of said edge portions is caused to have the proper width of metal between its appropriate conducting-roll and the tube-joint, an initial guide, initial draft-rolls, a second guide, current-conducting rolls, compression-rolls, and a final set of draft-rolls being located in relative succession in the direction of the tube movement and performing their respective functions one after the other in order of time.

Pressure-rollers M and M', located, respectively, before and after the set of final draft-rolls, are adapted to bear down upon the tube and maintain it in horizontal line at such points.

For welding taper-tubes I employ a special set of compression-rolls N, (shown in Figs. VIII and IX,) the groove n of such rolls being of spiral form, gradually decreasing from the greatest to the least diameter of the tube.

In operating the machine the tube is fed into the feed-rolls J', the initial guide L' directing it, the said rolls having been previously adjusted to exert the required amount of draft. After passing through said rolls the tube directed by the second guide L is received by the conducting-rolls, the latter being adjusted to compress the tube sufficiently to bring the contiguous free edges of the joint into contact, whereupon the electric current passes across the joint and heats the metal on opposite sides thereof to a welding heat. The tube is then received by the compression-rolls, which completely compresses the parts together and finishes the weld. The tube is thereafter received by the final set of draft-rolls, which effects the proper delivery thereof.

It is apparent from the foregoing that my machine embodies the following: two electric-current-conducting rolls respectively connected with opposite electric poles and also tending to press the joint edges together while directly bearing, respectively, upon the opposite edge portions of the butt-joint of a tube, all without bearing upon such joint; two other rolls located, respectively, on opposite sides of said conducting-rolls and tending to force the joint edges together by compression of the tube along lines of pressure angular to those of said conducting-rolls and also tending to feed the tube forward; a joint-guide located in the line of movement of the tube before said conducting-rolls and in a plane passing centrally through the clear space between the latter and adapted by engagement with the joint edges to insure each of the edge portions being in contact with only its appropriate one of the two conducting-rolls and being properly in contact with such one; draft means tending to pass the tube between said compression-rolls, said conducting and compression rolls being relatively located so that a plane right angular to the line of movement of the tube may pass through them all, the axial plane of the conducting-rolls across the line of movement of the tube being before the axial plane of the compression-rolls across such line, the construction and insulation of such members excluding the passage of the electric current otherwise than by said conducting-rolls, each of said conducting-rolls having contact with only its appropriate one of the two edge portions of the butt-joint, such edge portions transmitting the current across said joint.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a tube-welding machine, the combination of two electric-current-conducting devices respectively connected with opposite electric poles and adapted to directly press respectively on the opposite edge portions of the butt-joint of a tube, and two rolls tending to force said butt edges together by compression of the tube along lines of pressure angular to those of said conducting devices, substantially as set forth.

2. In a tube-welding machine, the combination of two electric-current-conducting devices respectively connected with opposite electric poles and adapted to have contact respectively with the opposite edge portions of the butt-joint of a tube while free from contact with such joint, and two rolls located respectively on opposite sides of said conducting devices and tending to force said butt edges together, substantially as set forth.

3. In a tube-welding machine, the combination of two electric-current-conducting devices respectively connected with opposite electric poles and adapted to have contact respectively with the opposite edge portions of the butt-joint of a tube, and two rolls adapted to compress such tube between them and thereby force said joint edges together, such conducting devices and rolls relatively located so that a plane right angular to the line of movement of the tube may pass through them all, substantially as set forth.

4. In a tube-welding machine, the combination of two electric-current-conducting rolls respectively connected with opposite electric poles and tending to press together the opposite edges of the butt-joint of a tube by directly bearing respectively upon such two edge portions but not upon said joint, and two rolls tending to force together said edges by compression of the tube between them along lines of pressure angular to those of said conducting-rolls, substantially as set forth.

5. In a tube-welding machine, the combination of two electric-current-conducting rolls respectively connected with opposite electric poles and adapted to press respectively on the opposite edge portions of the butt-joint of a tube, while free from contact with such joint, and two other rolls located respectively on opposite sides of said conducting-rolls and adapted to compress the tube between them, such four rolls being relatively located so that a plane right angular to the line of movement of the tube may pass through them all, substantially as set forth.

6. In a tube-welding machine, the combination of two electric-current-conducting rolls respectively connected with opposite electric poles and tending to press together the opposite edges of the butt-joint of a tube by directly bearing respectively upon such two edge portions while free from bearing upon such joint, and two other rolls located respectively on opposite sides of said conducting-rolls and tending to force said edges together by compression of the tube between them along lines of pressure angular to those of said conducting-rolls, such four rolls being located so that a plane right angular to the line of movement of the tube may pass through them all; the construction and insulation of said members excluding passage of said electric current otherwise than by said conducting-rolls, each of which latter has contact with only its appropriate one of said two edge portions, and by such edge portions transmitting said current across said joint, substantially as set forth.

7. In a tube-welding machine, the combination of two electric-current-conducting rolls respectively connected with opposite electric poles and adapted to bear respectively upon opposite edge portions of the butt-joint of a tube, but not upon such joint, and two other rolls electrically disconnected from said conducting-rolls and adapted to partially inclose the tube respectively to opposite sides of said conducting-rolls at points farther from the butt-joint than are said conducting-rolls, and adapted to exert feeding force as well as compressing force upon the tube, substantially as set forth.

8. In a tube-welding machine, the combination of two electric-current-conducting rolls respectively connected with opposite electric poles and adapted to have contact respectively with the opposite edge portions of the butt-joint of a tube, and two rolls adapted to compress such tube between them, the axial plane of said conducting-rolls across the line of movement of the tube being before the axial plane of said compression-rolls across such line, substantially as set forth.

9. In a tube-welding machine, the combination of two electric-current-conducting rolls respectively connected with opposite electric poles and adapted to have contact respectively with the opposite edge portions of the butt-joint of a tube, and two rolls adapted to compress such tube between them, the axial plane of said conducting-rolls across the line of movement of the tube being before the axial plane of said compression-rolls across such line, such four rolls being located so that a plane right angular to the line of movement of the tube may pass through them all, substantially as set forth.

10. In a tube-welding machine, the combination of two electric-current-conducting devices having a clear space between each other and respectively connected with opposite electric poles and adapted to have contact respectively with the opposite edge portions of the butt-joint of a tube, and two rolls located respectively on opposite sides of said conducting devices and adapted to compress the tube between them, together with a joint-guide located in a plane passing through said clear space between said conducting devices and adapted by engagement with the joint edges to cause each of such edge portions to have contact with only its appropriate one of said conducting devices, substantially as set forth.

11. In a tube-welding machine, the combination of two electric-current-conducting devices having a clear space between each other and respectively connected with opposite electric poles and adapted to have contact respectively with the opposite edge portions of the butt-joint of a tube, and two rolls located respectively on opposite sides of said conducting devices and adapted to compress the tube between them, together with a joint-guide located before said conducting devices in a plane passing centrally through said clear space between them and adapted by engagement with the joint edges to cause the joint to be maintained in proper position relatively to said conducting devices, substantially as set forth.

12. In a tube-welding machine, the combination of two electric-current-conducting devices respectively connected with opposite electric poles and adapted to have contact respectively with the opposite edge portions of the butt-joint of a tube, two rolls located respectively on opposite sides of said conducting devices and adapted to compress the tube between them, and draft means tending to pass the tube between said compression-rolls, substantially as set forth.

13. In a tube-welding machine, the combination of two electric-current-conducting rolls having a clear space between each other and respectively connected with opposite electric poles and adapted to press respectively on the opposite edge portions of the butt-joint of a tube, two rolls located respectively on opposite sides of said conducting-rolls and adapted to compress the tube between them, a joint-guide located before said conducting-rolls and in a plane passing centrally through said clear space between them and adapted to engage with the joint edges, draft means tending to pass the tube between the compression-rolls, the axial plane of the conducting-rolls across the line of movement of the tube being before the axial plane of the compression-rolls across such line, said four rolls being located so that a plane right angular to the line of movement of the tube may pass through them all, the construction and insulation of said members excluding passage of said electric current otherwise than by said conducting-rolls, each of which latter has contact with only its appropriate one of said edge portions, and by such edge portions transmitting said current across said joint, substantially as set forth.

Signed by me this 17th day of January, 1898.

OTTO PARPART.

Attest:
  THOS. B. HALL,
  D. T. DAVIES.